United States Patent

Noda et al.

[11] Patent Number: 5,146,822
[45] Date of Patent: Sep. 15, 1992

[54] PROCESS FOR PRODUCING PELLETS

[75] Inventors: Shuhei Noda, Akashi; Kiyoji Hashimoto, Okayama, both of Japan

[73] Assignee: Kuraray Co., Ltd., Kurashiki, Japan

[21] Appl. No.: 758,534

[22] Filed: Sep. 9, 1991

Related U.S. Application Data

[63] Continuation of Ser. No. 557,599, Jul. 25, 1990, abandoned.

[30] Foreign Application Priority Data

Jul. 31, 1989 [JP] Japan .................. 1-199606

[51] Int. Cl.⁵ .................. B26D 1/56; B29C 47/88
[52] U.S. Cl. .................. 83/22; 83/37; 83/169; 83/349; 83/422; 83/906; 264/143; 425/71
[58] Field of Search .......... 83/906, 950, 169, 913, 83/22, 37, 167, 349, 331, 422, 436; 425/DIG. 230, 71; 264/143

[56] References Cited

U.S. PATENT DOCUMENTS

| | | | |
|---|---|---|---|
| 2,808,884 | 10/1957 | Shann et al. | 83/422 X |
| 2,975,483 | 3/1961 | Cooper et al. | 83/906 X |
| 2,978,942 | 4/1961 | Casino | 83/906 X |
| 3,186,277 | 6/1965 | Brunner | 83/906 X |
| 3,651,726 | 3/1972 | Laroche | 83/169 |
| 4,528,157 | 7/1985 | Lettner et al. | 425/71 X |
| 4,759,248 | 7/1988 | Müller et al. | 83/349 |
| 4,913,899 | 4/1990 | Hartig | 425/71 |

FOREIGN PATENT DOCUMENTS 56-500169 2/1981 Japan .
62-218111 9/1987 Japan .

Primary Examiner—Frank T. Yost
Assistant Examiner—Rinaldi Rada
Attorney, Agent, or Firm—Kramer, Brufsky & Cifelli

[57] ABSTRACT

Provided is a process for producing pellets which comprises introducing strands between two upper and lower feed rolls using a belt conveyor slanted down forward with a press roll mounted thereon, then introducing the strands to a support having a fixed blade on the head thereof and cutting the strands with a rotary blade while spraying a liquid onto the strands from above the support.

This process can give pellets having no obliquely cut surface and having a uniform cut length.

4 Claims, 1 Drawing Sheet

PROCESS FOR PRODUCING PELLETS

This application is a continuation of application Ser. No. 07/557,599, filed Jul. 25, 1990, now abandoned.

BACKGROUND OF THE INVENTION

1. Field of the Invention

The present invention relates to a process for producing pellets having straight cut surfaces and a uniform cut length by cutting strands.

2. Description of the Prior Art

A strand cutter comprising feed rolls, a fixed blade and a rotary blade is generally used for cutting strand-shaped articles, which are obtained by melt extruding a thermoplastic resin or extruding a solution thereof through a die plate into a liquid, into pellets having a length of 1.0 to 5.0 mm. The cutter adequately cuts strands having a degree of hardness or rigidity, but it does not cut soft and flexible strands into pellets having no obliquely cut surfaces and a uniform cut length.

For example, Japanese Pat. Kohyo No. 500169/1981 discloses a process involving the use of an apparatus in which the upper feed roll of a pair of feed rolls is located slightly ahead of the lower one. The strands are passed through the two rolls to a support having at the top thereof a fixed blade and cut into pellets. This apparatus, however, cannot cut flexible strands into uniform pellets.

Where a multiplicity of flexible strands are cut with a conventional strand cutter, the strands may be introduced by hand one by one between upper and lower feed rolls. In this case, it is necessary to bring the hands in close proximity to the feed rolls because of the flexibility of the strands. As a result, there is a risk of pinching the hands. Furthermore, a considerably long time is required to complete the introduction. In particular, in the case where at least one hundred strands are introduced by hand, strand loss is quite high during the time it takes to introduce the strands, which is not preferred. On the other hand, attempting to introduce the strands in a bundle results in twisting of the bundle caused by overlapping strands before the bundle reaches the feed rolls. This in turn disturbs the feed of the strands and results in obliquely cut pellets or pellets having an uneven cut length.

Even if many strands could be introduced into the feed rolls while being laid in parallel, the strands will, because of their flexibility, vigorously vibrate vertically and horizontally between the feed rolls and the rotary blade owing to impact, repulsion or the like at each cutting to give pellets obliquely cut or having an extremely uneven cut length. Use of the thus-obtained obliquely cut or uneven pellets in extrusion results in fluctuations in the amount charged to the extruder, fluctuations in load of the extruder or the like, thereby rendering it difficult to consistently obtain uniform molded articles

SUMMARY OF THE INVENTION

Accordingly, an object of the present invention is to provide a process for producing pellets which comprises introducing strands between upper and lower feed rolls using a belt conveyor slanted downwardly with a press roll mounted thereon, then introducing the strands to a support having a fixed blade on the head thereof and cutting the strand with a rotary blade while spraying a liquid onto the strands from above the support.

DETAILED DESCRIPTION OF THE PREFERRED EMBODIMENTS

The present inventors had intensively studied to solve the above-described problems and, as a result, found that, in introducing many strands into the feed rolls while laying them in a direction parallel to the advancing conveyor, it is effective to mount a belt conveyor slanted downwardly just before the pair of feed rolls and a press roll for pressing the strands on the slanted conveyor. The use of a conveyor as a means for introducing strands into a strand cutter is known. However, it is extremely difficult to place a multiplicity of flexible strands on a belt conveyor while laying the strands in parallel. When the ends of the strands reach the conveyor, the strands tend to bend in directions other than that of the moving direction of the belt. Alternatively, the strands overlap each other on the belt, and hence the direct introduction of such strands between the upper and lower feed rolls results in the deviation of the strands from the feed rolls of the twisting of the strands. By employing a belt conveyor, which is slanted downwardly with a press roll mounted thereon, it is possible to place the ends of the strands parallel with the advancing direction on the belt conveyor, to separate the strands which have overlapped on the belt into parallelly laid strands and smoothly introduce the strands between the upper and lower feed rolls. The inclined angle of the belt conveyor to the horizontal plane is at least 20°, preferably at least 30°, and not more than 80° in practical use. It is preferred that the speed of the belt conveyor be a little lower than the take-up speed of the upper and lower feed rolls. The belt of the belt conveyor may be formed from raw materials such as various rubbers and flexible resins such as polyvinyl alcohol. It is also necessary that the press roll press the strands on the belt conveyor by use of the weight of the roll itself, spring pressure or air pressure. Too large a pressing force by the press roll will cause a failure in introducing strands between the press roll and the belt, formation of deformed strands or the like. On the other hand, too small a force will allow the press roll to be raised by overlapped strands, whereby the overlapped strands pass under the roll as they are. It is therefore preferred that the press roll be adjustable for the purpose of selecting an appropriate force. Furthermore, it is most effective if the press roll is mounted so that the clearance between the press roll and the belt conveyor will be equal to or a little smaller than the maximum length of the strand cross section for the purpose of obtaining the smooth introduction between the roll and conveyor.

The present inventors further found that the horizontal and vertical vibration of the strands can be minimized by introducing the strands to a support having a fixed blade on the head thereof after they have passed between the upper and lower feed rolls and spraying a liquid onto the strand from above the support, thereby permitting the strands to be cut smoothly with a rotary blade.

Water, an organic liquid which does not exert negative influences on the strands, or mixtures of water and this liquid can be used as the spraying liquid. The amount sprayed may be such that the surfaces of the strands are fully moistened. Too much liquid will disturb strand movement by the liquid flow, which is not preferred. It is therefore desired that the amount sprayed be adjustable judging from the strand movement. It is also preferred that spraying direction be radial and perpendicular to the strand movement.

As stated heretofore, pellets having straight cut surfaces and a highly uniform cut length can be obtained by introducing strands between the upper and lower feed rolls using a belt conveyor slanted downwardly with a press roll mounted thereon and then passing the strands to a support having a fixed blade on the head thereof, and, thereafter, cutting the strands with a rotary blade while spraying a liquid from above the support. In the case where any one of these conditions is not satisfied, the above-described advantages cannot be produced, as is apparent from the Reference Examples described herein.

Furthermore, in the present invention, it was found that, for the purpose of obtaining pellets having good cut surfaces and a uniform cut length, the following conditions will enhance the effects. The upper one of the two feed rolls is located slightly ahead of the lower one and the tangential plane at the contact point of the upper and lower rolls crosses the upper surface of a support having a fixed blade at the head thereof which is mounted between the lower roll and a rotary blade. In addition, the distance between the contact point of the upper and lower feed rolls and the end of the fixed blade is adjusted to not more than 70 mm, preferably not more than 60 mm. By employing these conditions, the strands having passed between the upper and lower feed rolls are perfectly pressed on the upper surface of the support having a fixed blade o the head thereof. In combination with this result, the above-described liquid spraying from above the support almost perfectly suppresses the horizontal and perpendicular vibration, thereby giving pellets having good cut surfaces and a highly uniform cut length without oblique cuts. The upper surface of the support as referred to herein also includes, in the case where a scraper is equipped between the lower feed roll and the support and plays a role as support, the upper surface of the scraper.

An example of particularly preferred strands to be cut in accordance with the present invention is a flexible resin strand that will, when placed on a horizontal table and pulled out of the end of the table by 10 cm, hang down by its weight at 20° C. so that the height from the tip end of the strand to the horizontal plane of the horizontal table will be 3 to 9 cm. Examples of the raw material for these strands are various thermoplastic resins, elastomers, and rubbers, among which the preferred is an ethylene-vinyl alcohol copolymer.

BRIEF DESCRIPTION OF THE DRAWING

A more complete appreciation of the invention and many of the attendant advantages thereof will be readily obtained by reference to the following detailed description when considered in connection with the accompanying drawing, wherein.

Figure 1:
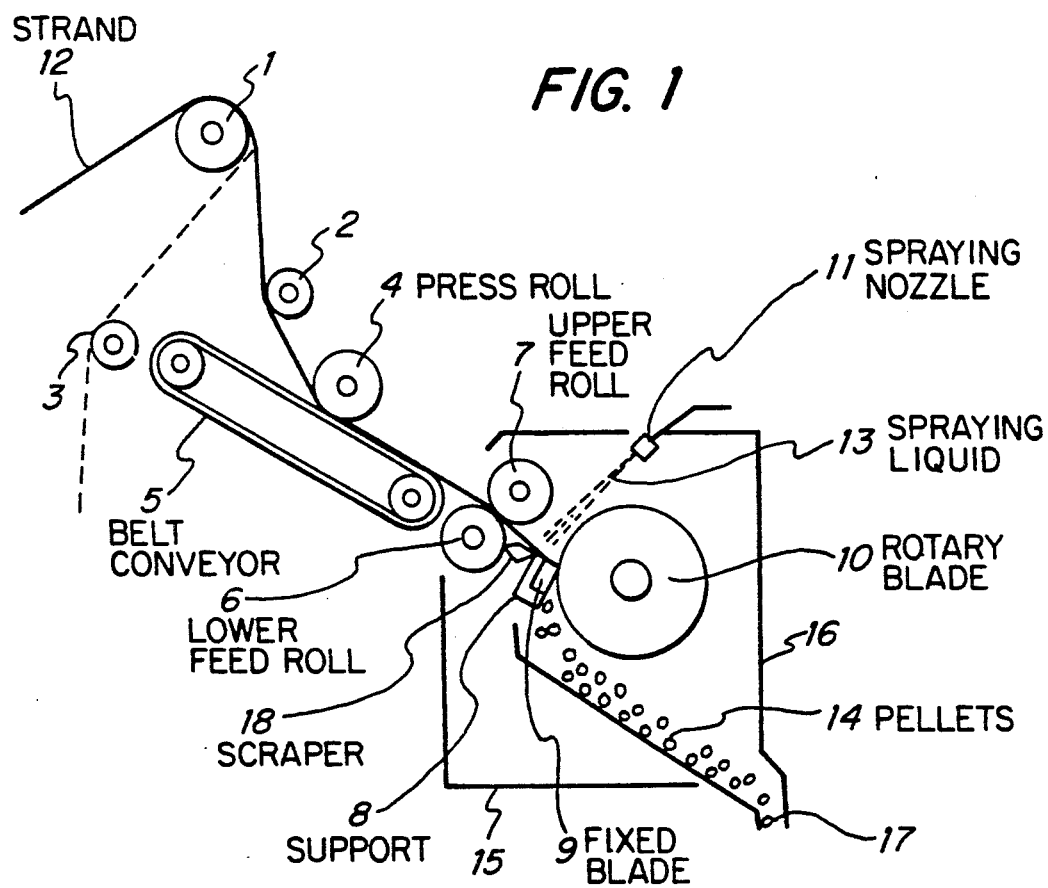
FIG. 1 is an example showing the process and apparatus of the present invention, where

| | |
|---|---|
| 1, 2 and 3 | Guide rolls |
| 4 | Press roll |
| 5 | Belt conveyor |
| 6 and 7 | A pair of, i.e., Upper and Lower feed rolls |
| 8 | Support |
| 9 | Fixed blade |

| | -continued |
|---|---|
| 10 | Rotary blade |
| 11 | Spraying nozzle |
| 12 | Strand |
| 13 | Spraying liquid |
| 14 | Pellets |
| 15 and 16 | Protecting covers |
| 17 | Outlet for pellets and spraying liquid |
| 18 | Scraper |

FIG. 1 is an example of the apparatus for practicing the process of the present invention. The outline is explained with reference to FIG. 1 as follows. Strand bundle 12 is passed through Rolls 1 and 3, and allowed to run downward continuously before Belt conveyor 5. Strands 12 are laid in parallel on Roll 1. Thereafter, the strands between Rolls 1 and 3 are cut with a cutting device, such as a pair of scissors, and the cut ends of the strands are, through Roll 2, laid on belt conveyor 5 slanted downwardly. The strands are laid in parallel by action of Roll 4 and then introduced between the two Feed rolls 6 and 7 of a strand cutter (Upper feed roll 7 is located slightly ahead of Lower feed roll 6), sprayed, while being pressed on the upper surfaces of Scraper 18 and Support 8 having Fixed blade 9 on the head thereof, with Spraying liquid 13 from Spray nozzle 11 above the support, and cut with the strand cutter comprising Support 8, Fixed blade 9 and Rotary blade 10 to yield Pellets 14 having no obliquely cut surfaces and having a uniform cut length. The cut pellets are then taken, together with the liquid spray, out through outlet 17 and subjected to processes such as liquid separation, washing and drying to yield the desired pellets. Items 15 and 16 are protective covers for Feed rollers 6 and 7 and Strand cutters 8, 9 and 10.

The present invention is particularly suitable for obtaining pellets from strands having a thick diameter. The diameter is at least 1 mm, preferably at least 2 mm and not more than 5 mm, preferably not more than 4 mm. The length of the cut pellet is 1 to 8 mm, preferably 1 to 5 mm.

Other features of the invention will become apparent in the course of the following descriptions of exemplary embodiments which are given for illustration of the invention and are not intended to be a limitation thereof.

EXAMPLES

EXAMPLE 1

A solution comprising 31 parts of an ethylene-vinyl alcohol copolymer having an ethylene content of 32 mol% and a saponification degree of vinyl acetate component of 99 mol%, 46 parts of methanol and 23 parts of water was extruded through a die with 50 holes having a pore size of 4 mm into a mixed liquid of water and methanol (10 wt%) at 20° C. to coagulate into strands. A piece of the thus-obtained strands was sampled by about 20 cm in length and this sample was placed on a horizontal table, while extending out of the end of the table by 10 cm, and allowed to hang at 20° C. The height from the tip end of the strand to the horizontal plane of the table was 6.1 cm.

A strand bundle comprising 50 pieces of strand was cut with the apparatus illustrated in FIG. 1 to give pellets. Details of the apparatus employed and the operating conditions are as follows:

| Belt conveyor 5: | |
| --- | --- |
| Belt width: | 400 mm |
| Belt length: | 400 mm |
| Inclined angle to the horizontal plane: | 30° |
| Raw material of belt: | rubber |
| Speed of belt conveyor: | 14.7 m/min |
| Press roll 4: | |
| Diameter: | 90 mm |
| Width: | 400 mm |
| Strand cutter 8, 9 and 10: | |
| Width of Rotary blade 10: | 400 mm |
| Diameter of Rotary blade 10: | 200 mm |
| Number of teeth: | 32 |
| Diameter of Upper feed roll 7: | 90 mm |
| Diameter of Lower feed roll 6: | 80 mm |
| Revolution speed of Upper and Lower feed rolls: | 15.0 m/min |
| Distance between the contact point of the upper and lower feed rolls and the top end of Fixed blade 9: | 50 mm |
| The tangential plane at the contact point of the upper and lower feed rolls is parallel with the upper surface of Support 8 having Fixed blade 8 on the head thereof and the upper surface of Scraper 18. | |
| Spraying: water is sprayed at a rate of 4 l/min between the feed roll and the rotary blade in the direction perpendicular to the strand flow using an oblate fan-shaped spraying nozzle. | |

The strand bundle was arranged parallelly after passing through Press roll 4 of the belt conveyor, and smoothly introduced between Upper and Lower feed rolls without forming twist of the bundle at all before the feed rolls. Furthermore, the pellets obtained by cutting with the strand cutter had no obliquely cut surfaces and had an average cut length of 3.3. mm and a standard deviation of length of 0.30 mm.

EXAMPLE 2

The same procedure as in Example 1 was followed except that the position of Upper feed roll 7 was changed such that the tangential section at the contact point of the Feed rolls 6 and 7 would cross the upper surface of Scraper 18 to give pellet articles having an average cut length of 3.2 mm and a standard deviation of length of 0.11 mm.

REFERENCE EXAMPLE 1

The press roll equipped on the belt conveyor in Example 1 was removed and then a strand bundle was introduced. The strands on the belt, when introduced as they were between the feed rolls of the strand cutter, formed a twist of the strands before the feed rolls, thereby generating horizontal and vertical vibration between the feed rolls and the rotary blade. Hence the pellets obtained had obliquely cut surfaces and had a standard deviation of length of 0.70 mm.

REFERENCE EXAMPLE 2

The same procedure as in Example 1 was followed except that the belt conveyor was positioned horizontally. This resulted in part of the strand bundle being placed on the belt of the belt conveyor while being folded in a direction other than the moving direction of the belt, turned aside and did not enter between the press roll and the belt, and hence could not be introduced into the strand cutter.

REFERENCE EXAMPLE 3

The same procedure as in Example 1 was followed except that water was not sprayed between the Upper and Lower feed rolls and the rotary blade to give pellets, which had many obliquely cut surfaces and had an average cut length of 3.4 mm and a standard deviation of 0.60 mm.

Obviously, numerous modifications and variations of the present invention are possible in light of the above teachings. It is therefore to be understood that, within the scope of the appended claims, the invention may be practiced otherwise than as specifically described herein.

We claim:

1. A process for producing pellets comprising the steps of:
   A. aligning strands to be cut into pellets parallel to each other on a conveyor by the steps of:
      1. passing the strands along a conveyor slanted downwardly in a direction of an advancement of the conveyor, wherein the strands are flexible resin strands that will, when laid on a table such that their ends when pulled to extend over an edge of said table by 10 cm, will, upon release, hand down by their weight at 20° C. to a length measured from the end of said strands to a horizontal plane of said table of from 3 to 9 cm., and
      2. passing the strands between a press roll mounted on the conveyor and the conveyor surface; then
   B. introducing the thus aligned advancing strands between upper and lower feed rolls,
   C. causing the strands to come in contact with a support having a fixed blade on a head thereof, wherein a tangential plane at the contact point of the upper and lower feed rolls crosses an upper surface of the support having the fixed blade of the head thereof; and
   D. cutting the strands with a rotary blade while simultaneously spraying a liquid onto the strands from above the support so that said liquid impinges upon the strands in a region between the feed rolls and the fixed and rotary blades.

2. A process as defined in claim 1 wherein said resin strands are formed from ethylene-vinyl alcohol copolymer.

3. A process for producing pellets comprising the steps of:
   aligning strands to be cut into pellets parallel to each other on a moving conveyor belt by passing strands to be cut into pellets along a conveyor slanted downwardly in a direction of an advancement of the conveyor, wherein said strands are flexible resin strands that will, when laid on a table such that their ends when pulled to extend over the edge of said table by 10 cm, will, upon release, hang down by their weight at 20° C. to a length measured from the end of the strands to a horizontal plane of the table of from 3 to 9 cm., and then
   passing the strands between a press roll mounted on the conveyor and a conveyor surface; then
   introducing the thus aligned advancing strands between upper and lower feed rolls, then
   causing the strands to come in contact with a support having a fixed blade on the head thereof; wherein a tangential plane at a contact point of the upper and lower feed rolls crosses an upper surface of the support having the fixed blade of the head thereof, and wherein the distance between the contact point of the upper and lower feed rolls and a head of the fixed blade of the support is not more than 70 mm; and cutting the strands with a rotary blade while simultaneously spraying a liquid onto the strands from above the support so that said liquid impinges upon the strands in the region between the feed rolls and the blades.

4. A process as defined in claim 3 wherein said resin strands are formed from ethylene-vinyl alcohol copolymers.

* * * * *